United States Patent
Luu et al.

(10) Patent No.: US 9,373,147 B2
(45) Date of Patent: Jun. 21, 2016

(54) MOBILE TICKER

(71) Applicants: Francis Luu, San Francisco, CA (US); Alexander Urim, San Francisco, CA (US); Rose Yao, San Francisco, CA (US)

(72) Inventors: Francis Luu, San Francisco, CA (US); Alexander Urim, San Francisco, CA (US); Rose Yao, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 79 days.

(21) Appl. No.: 13/630,605

(22) Filed: Sep. 28, 2012

(65) Prior Publication Data

US 2014/0096062 A1 Apr. 3, 2014

(51) Int. Cl.
*G06F 3/048* (2013.01)
*G06Q 50/00* (2012.01)
*H04L 12/58* (2006.01)

(52) U.S. Cl.
CPC ............. *G06Q 50/01* (2013.01); *H04L 51/32* (2013.01)

(58) Field of Classification Search
CPC ........................................................ G06F 3/048
USPC ........................................................ 715/774
See application file for complete search history.

(56) References Cited

U.S. PATENT DOCUMENTS

| 7,539,697 | B1 * | 5/2009 | Akella et al. | |
|---|---|---|---|---|
| 7,827,208 | B2 * | 11/2010 | Bosworth et al. | 707/802 |
| 8,171,128 | B2 * | 5/2012 | Zuckerberg et al. | 709/224 |
| 2008/0040673 | A1 * | 2/2008 | Zuckerberg et al. | 715/745 |
| 2008/0162510 | A1 * | 7/2008 | Baio et al. | 707/100 |
| 2009/0150551 | A1 * | 6/2009 | Pagan | 709/228 |
| 2011/0153421 | A1 * | 6/2011 | Novikov et al. | 705/14.52 |
| 2012/0150772 | A1 * | 6/2012 | Paek et al. | 706/12 |
| 2012/0198334 | A1 * | 8/2012 | Surin et al. | 715/716 |

* cited by examiner

*Primary Examiner* — Matthew Ell
(74) *Attorney, Agent, or Firm* — Baker Botts L.L.P.

(57) ABSTRACT

In one embodiment, a method includes receiving from a server, by a mobile computing device, real-time activity stories for display by the mobile computing device. The real-time activity stories are sent automatically by the server to the mobile computing device while a user is interacting with the mobile computing device. The method also includes receiving from the server, by the mobile computing device, news-feed stories for display by the mobile computing device. The news-feed stories are sent by the server to the mobile computing device in response to requests from the mobile computing device for the news-feed stories. The method also includes displaying, by the mobile computing device, to the user the real-time activity stories and the news-feed stories in a scrollable visual stack.

20 Claims, 9 Drawing Sheets

MOBILE TICKER

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a news feed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may provide to a user a news feed including one or more news-feed stories. Each news-feed story may include content related to a specific subject matter or topic. In particular embodiments, the social-networking system may aggregate information of user activities related to a specific subject matter into a news-feed story.

In particular embodiments, the social-networking system may provide to a user a stream of real-time activity stories. The social-networking system may provide to the user a real-time activity story related to a particular activity, as the particular activity happens.

In particular embodiments, a user's mobile computing device may send a request to the social-networking system, causing the social-networking system to send news-feed stories to the mobile computing device. The social-networking system may also send to the user's mobile computing device real-time activity stories, as the respective corresponding activities happen. The mobile device may display to the user the real-time activity stories and the news-feed stories in a scrollable visual stack. The real-time activity stories and the news-feed storied in the scrollable visual stack may be ordered chronologically, with the most recent real-time activity story (or most recent news-feed story) placed on top of the scrollable visual stack.

DESCRIPTION OF EXAMPLE EMBODIMENTS

Figure 1:
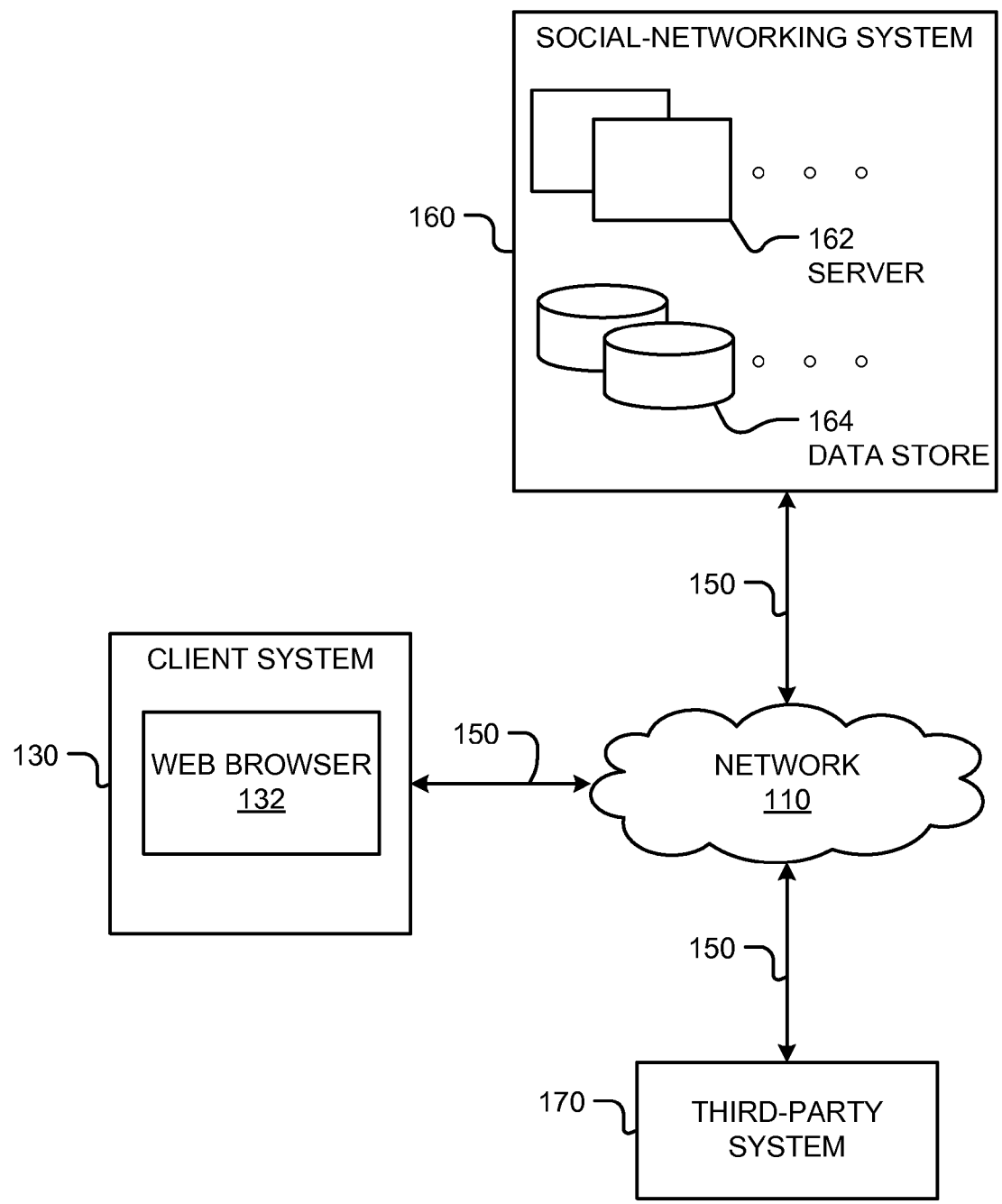
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to a server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a news feed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Figure 2:
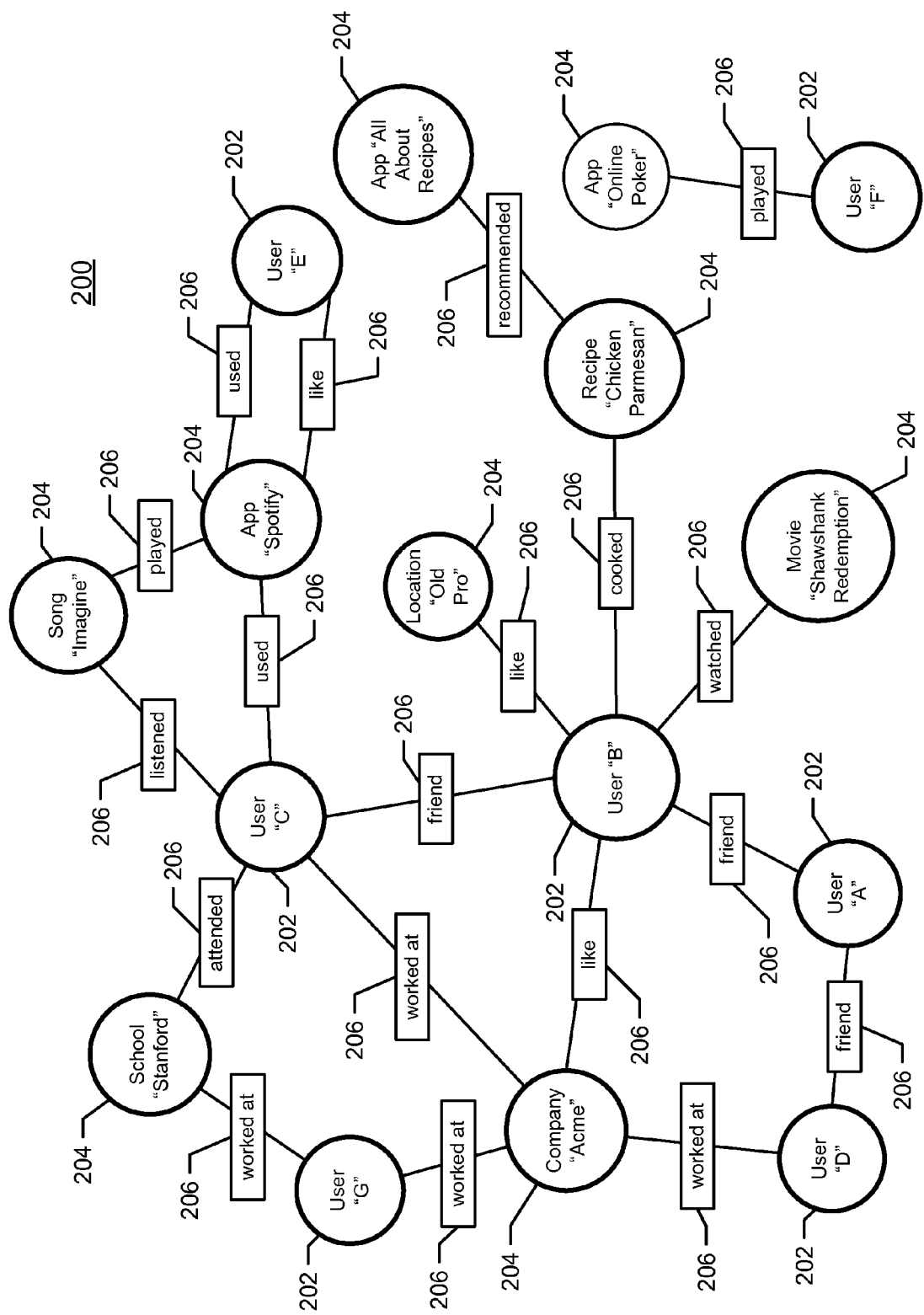
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web pages or one or more user-profile pages (which may be web pages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with an URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

As described earlier, each time a user performs an activity or action (e.g., "like") on an item or object supported by a social-networking system or a third-party system, the social-networking system may record the action. For example the social-networking system may automatically create in a social graph an edge (e.g., an "like" edge) between a user node corresponding to the user and a node corresponding to the item or object, and store the edge in a data store. Therefore, the social-networking system may record many actions performed by different users of the social-networking system at different times.

The social-networking system may provide to a user frequently update content based on recorded activities or actions that may be related to the user. In particular embodiments, the social-networking system may support a news-feed service. In particular embodiments, a news feed may comprise a data format including one or more news-feed stories. Each news-feed story may include content related to a specific subject matter or topic. In particular embodiments, the social-networking system may aggregate activities or actions related to a specific user action into a news-feed story. For example, a first user may post a photo to the social-networking system, while other users of the social-networking system may perform various activities or actions related to the photo. Other users may "like" the photo, post comments related to the photo, or tag one or more particular users to the photo. The social-networking system may aggregate activities related to the photo into a news-feed story comprising an image of the photo, a profile picture of the first user, a count of "likes" of the photo by other users, and one or more comments related to the photo. As for another example, a first user may checks in to a webpage (maintained by the social-networking system or a third-party system) corresponding to a place (e.g., a landmark, a restaurant, a department store). Other users of the social-networking system may "like" the check-in activity, or post comments related to the check-in activity. The social-networking system may aggregate activities related to the check-in activity into a news-feed story comprising a link and an image of the webpage, a profile picture of the first user, a count of "likes" of the check-in activity by other users, and one or more comments related to the check-in activity. The social-networking system may also aggregate into the news-feed story update to the webpage, or advertising related to the webpage (e.g., on-line coupons from a business related to the webpage). In particular embodiments, the social-networking may present a news feed including one or more news-feed stories to a viewing user. For example, an application (e.g., a web browser) hosted by a client device of the viewing user may retrieve a news feed from the social-networking system and display the news feed in the application's user interface. The application may display each news-feed story in the news feed in a respective frame (e.g., an HTML iFrame) in the application's user interface.

The social-networking system may aggregate activities or actions into news-feed stories based on social-graph information. For example, the social-networking system may aggregate for a viewing user a news feed including news-feed stories related to activities or actions performed by users who are within a specified degree of separation (e.g., within two degrees of separation) from the viewing user on the social graph. The social-networking system may aggregate activities or actions into news-feed stories based on privacy settings. For example, a user may specify which other users can access information of a particular activity performed by the user. The social-networking system may aggregate for a viewing user a news feed including news-feed stories related to activities accessible to the viewing user.

In particular embodiments, the social-networking system may provide to a user a stream of real-time activity stories (a real-time activity story "ticker"). That is, the social-networking system may provide to the user a story related to a particular activity as the particular activity happens. For example, a first user may perform an activity or action (e.g., post, "like", "check in", or comment). In response to the activity performed by the first user, the social-networking system may create a real-time activity story comprising one or more objects related to the activity (e.g., an image of a photo posted by the first user, a profile picture of the first user, a comment made by the first user, and so on), and present the real-time activity story to a viewing user. For example, the social-networking system may transmit the real-time activity story to a client device of the viewing user, causing the client device to display the real-time activity story in a user interface of an application (e.g., a web browser) hosted by the client device. The real-time activity story may be displayed in a frame (e.g., an HTML iFrame) within the user interface. The social-networking system may create and present to a viewing user a real-time story based on social-graph information. For example, the social-networking system may create and present to a viewing user a real-time story of an action performed by a first user if the first user is within a specified degree of separation (e.g., within one degree of separation) from the viewing user. The social-networking system may create and present to a viewing user a real-time story related to an action performed by a first user based on privacy settings (e.g., set by the first user).

As described above, a news-feed story (of a news feed) may comprise aggregated and often time-elapsed information related to an activity or action. Meanwhile a real-time activity story stream or ticker may comprise real-time activity stories, each real-time story relating to an activity just happened. An application hosted by a computing device may display a news feed and a real-time activity ticker in separate user interfaces (e.g., in separate columns of an HTML page). However, it may not be desirable to display a news feed and a real-time activity ticker in separate user interfaces for a mobile computing device due to its limited display size. Particular embodiments describe methods of displaying news-feed stories and real-time activity stories in a single user interface. More particularly, the single user interface may comprise a scrollable visual stack of real-time activity stories and news-feed stories.

Figure 3:
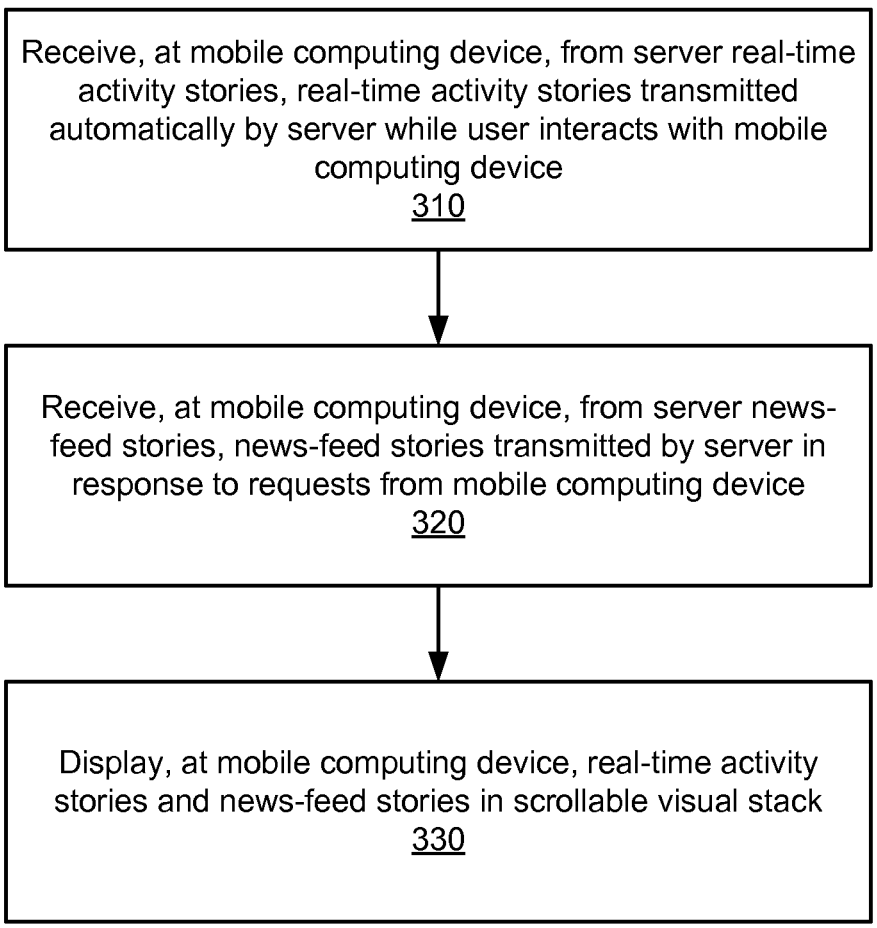
FIG. 3 illustrates an example method for displaying real-time activity stories and news-feed stories in a single user interface.

FIG. 3 illustrates an example method 300 for displaying real-time activity stories and news-feed stories in a single user interface. The example method 300 may be implemented by a mobile computing device of a user of the social-networking system. For example, the example method may be implemented by an application (or a process of an application) hosted by one or more processors of the mobile computing device. The example method 300 may begin at step 310. In particular embodiments, at step 310, the mobile computing device may receive from a server (e.g., a server 162 illustrated in FIG. 1) one or more real-time activity stories for display by the mobile computing device. In particular embodiments, the server may automatically transmit (push) the real-time activity stories to the mobile computing device while the user of the mobile computing device is interacting with the mobile computing device. The mobile computing device may determine that the user is interacting with the mobile computing device if the user launches a particular application (e.g., a web browser, or a special-purpose client application) to interact with the social-networking system. The mobile computing device may transmit a message to the server to register a service with the server, causing the server to automatically transmit one or more real-time activity stories to the mobile device. The mobile computing device may periodically (e.g., every 5 minutes) determine if the user is interacting with a user interface of the particular application (e.g., by monitoring the user's input to the user interface, or by monitoring whether the user interface is at the foreground of the mobile device's display). If the user is interacting with the user interface, the mobile computing device may transmit a message to the server, causing the server to keep the service alive. If the user is not interacting with the user interface, or the user has closed the particular application, the mobile computing device may transmit a message to the server, causing the server to terminate the service for transmitting real-time activity stories to the mobile device. The server may also terminate the service for transmitting real-time activity stories to the mobile device if the server does not receive a message (to keep the service alive) from the mobile computing device for over a specified time (e.g., over 5 minutes).

In some embodiments, the server may automatically transmit to the mobile computing device one or more real-time activity stories based on a power state of the mobile computing device. For example, if the mobile computing device's battery is less than a specified level of capacity (e.g., less than 15 percent of full capacity), the mobile computing device may transmit a message to the server to terminate the service for transmitting real-time activity stories to the mobile computing device in order to extend battery life. In other embodiments, the server may automatically transmit to the mobile computing device one or more real-time activity stories based on a network state of the mobile computing device. For example, the mobile computing device may transmit a message to the server to start the service for transmitting real-time activity stories to the mobile computing device only if the mobile computing device has a high-bandwidth network connection (e.g., Wi-Fi wireless connection).

In particular embodiments, at step 320, the mobile device may receive from the server one or more news-feed stories for display by the mobile computing device. In particular embodiments, the server may transmit the news-feed stories to the mobile computing device in response to requests from the mobile computing device for the news-feed stories. The mobile computing device may periodically retrieve (pull) news-feed stories from the server. For example, the user may launch a particular application to interact the social-networking system. The mobile computing device may then periodically (e.g., every 10 minutes) transmit a request (e.g., through an API) to the server, causing the server to transmit the news-feed stories to the mobile computing device. The user may also instruct the particular application (e.g., by selecting a refresh icon in the application's user interface) to transmit a request to the server, causing the server to transmit the news-feed stories to the mobile computing device. In particular embodiments, the mobile computing device may store (cache) a local copy of the news-feed stories at the mobile computing device (e.g., storing the news-feed stories in a local storage of the mobile computing device). The mobile computing device may transmit a request to the server, causing the server to transmit to the mobile computing device updates to the locally cached news-feed stories, and additionally new news-feed stories.

In some embodiments, the mobile computing device may transmit to the server a request for news-feed stories based on a power state of the mobile computing device. For example, if the mobile computing device's battery is less than a specified level of capacity (e.g., less than 15 percent of full capacity), the mobile computing device may prolong the period of time between two requests for news-feed stories, or transmit to the server a request for news-feed stories only in response to the user's request. In other embodiments, the mobile computing device may transmit to the server a request for news-feed stories based on a network state of the mobile computing device. For example, if the mobile computing device has a low-bandwidth network connection (e.g., 2G cellular connection), the mobile computing device may transmit to the server a request for news-feed stories only in response to the user's request.

Figure 4:
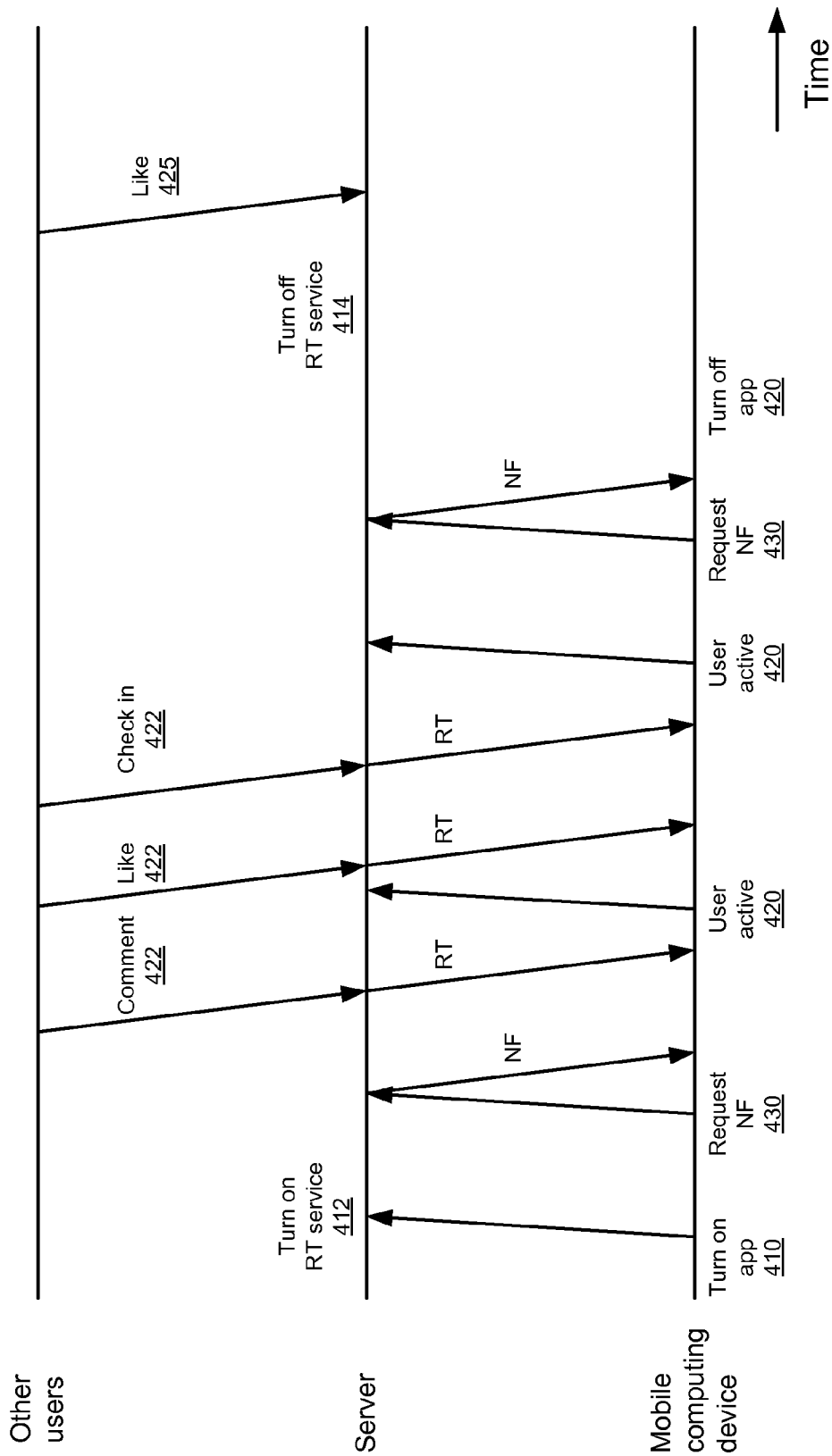
FIG. 4 illustrates example interactions between a mobile computing device and a server of a social-networking system.

For didactic purposes, FIG. 4 illustrates example interactions between the mobile computing device and the server of the social-networking system. As described earlier, as the user of the mobile computing device turns on a particular application to interact with the social-networking system (410), the mobile computing device may transmit a message to the server, causing the server to turn on a service for transmitting real-time activity stories. When a user activity 422 happens (e.g., a comment, a check-in, or a "like" by another user), the server may immediately transmit a corresponding real-time activity story to the mobile computing device (as denoted by the "RT" arrows illustrated in FIG. 4). The mobile device may determine that the user is active (420), and transmit a message to the server to keep the service for transmitting real-time activity stories alive. Meanwhile, for every specified period or time or in response to the user's request, the mobile computing device may transmit a request for news-feed stories to the server (430), causing the server to transmit news-feed stories to the mobile computing device (as denoted by the "NF" arrows illustrated in FIG. 4).

As illustrated in FIG. 4, after the user turns off the particular application (420), the server may turn off the service for transmitting real-time activity stories (414) as the server has not received a keep-alive message for over a specified period of time. The server may not transmit a real-time activity story in response to a user action 425 (by another user), as the service for transmitting real-time activity stories is not active (e.g., the user is not interacting with the mobile computing device).

Figure 5A:
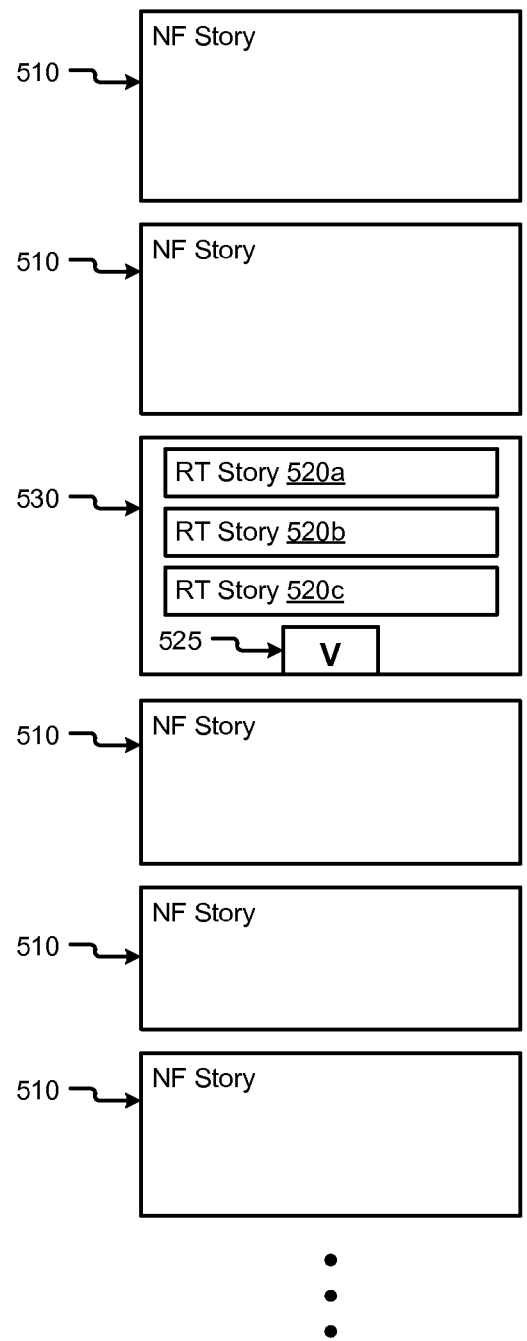
FIGS. 5A-5D illustrates an example scrollable visual stack.
Figure 5B:
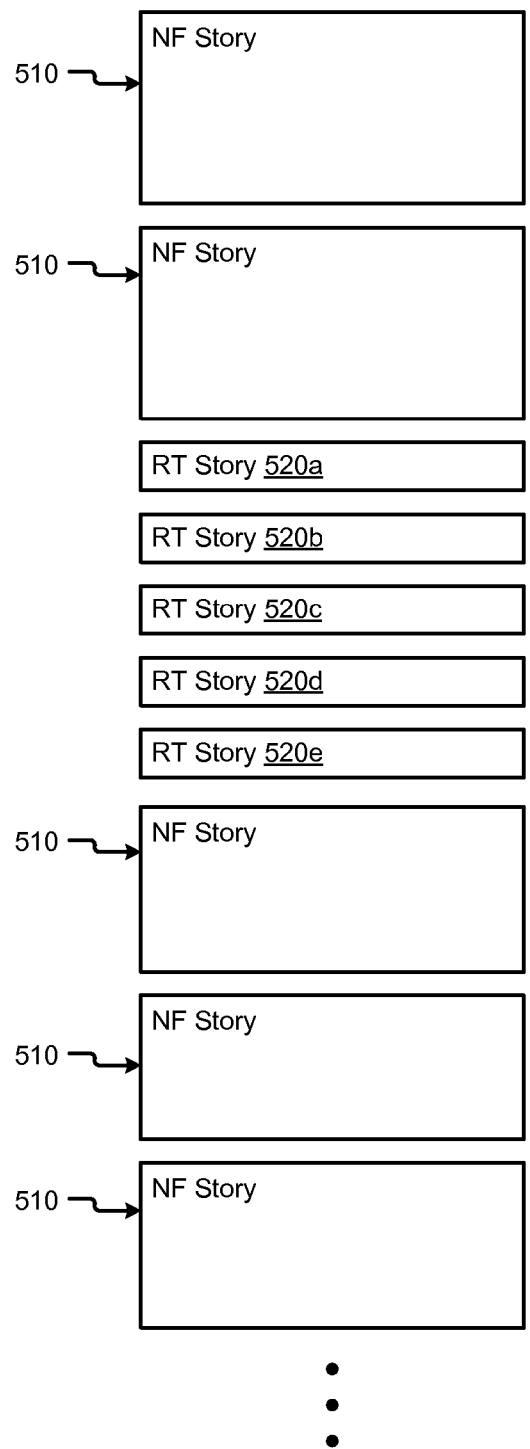

In particular embodiments, at step 330, the mobile computing device may display to the user the real-time activity stories and the news-feed stories in a scrollable visual stack of real-time activity stories and news-feed stories. In particular embodiments, the real-time activity stories and the news-feed stories may be ordered based in recency in the scrollable visual stack. In particular embodiments, the scrollable visual stack may comprise one or more frames, each frame displaying no more than a specified number of the real-time activity stories. FIGS. 5A-5D illustrates an example scrollable visual stack 500. The mobile computing device may display in its display all or a portion of the scrollable visual stack 500. The user of the mobile computing device may scroll up or down the scrollable visual stack 500 by using any suitable input methods (e.g., a swipe touch gesture performed on the mobile computing device's touch display). For example, the mobile computing device may display the scrollable visual stack 500 in chronological order with the most recent news-feed story 510 (or real-time activity story 520) at the top of the scrollable visual stack 500. As illustrated in FIG. 5A, the scrollable visual stack 500 may comprise a frame 530 (a "ticker box") that displays no more than three real-time activity stories (520a, 520b, and 520c). The frame 530 may further comprise a selectable icon 525 that indicates additional one or more real-time activity stories. For example, the user may select the selectable icon 525, causing the mobile computing device to display real-time activity stories 520d and 520e, in addition to the real-time activity stories 520a, 520b, and 520c, as illustrated in FIG. 5B.

Figure 5C:
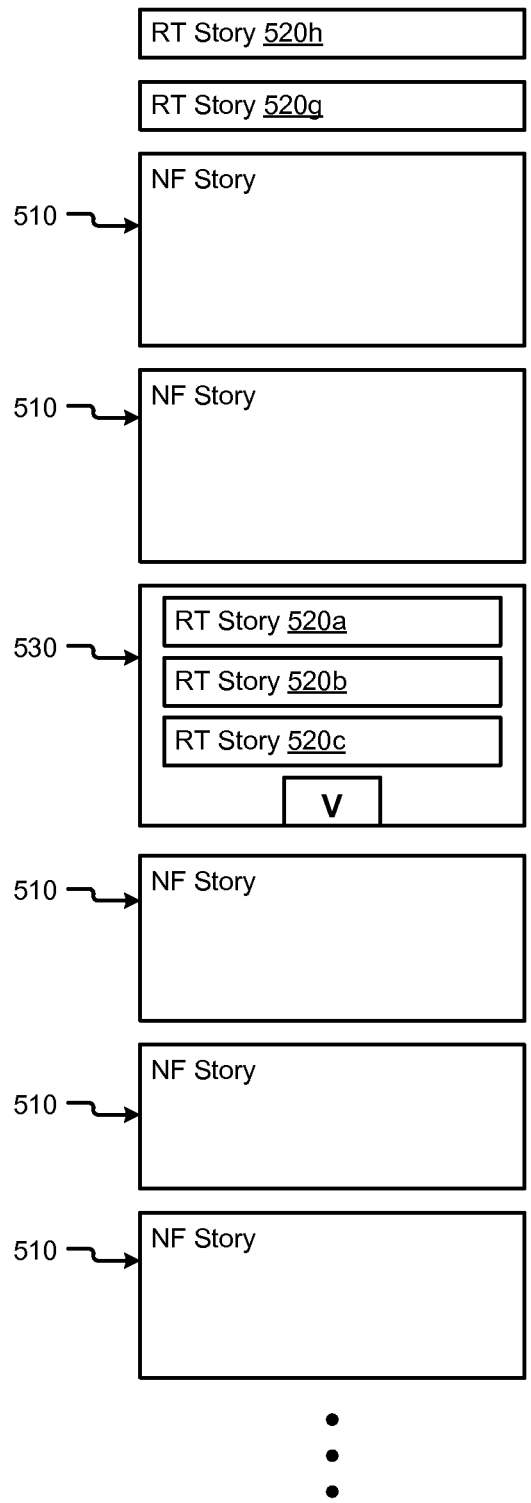
Figure 5D:
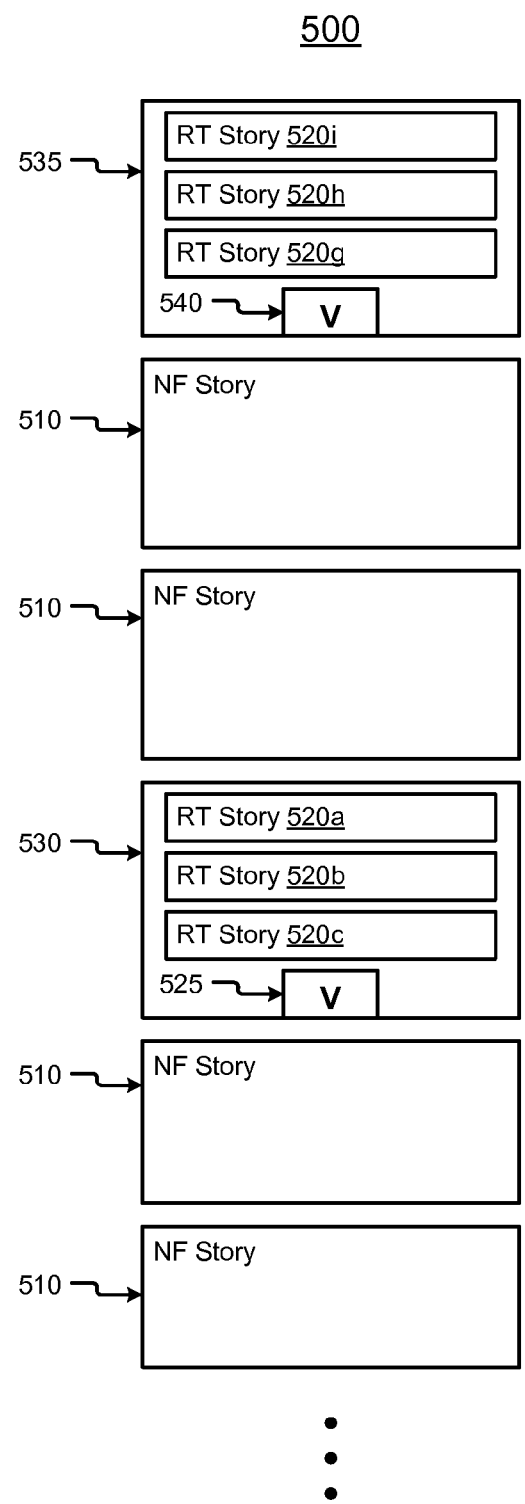

As described earlier, the server may transmit one or more real-time activity stories to the mobile computing device as the corresponding activities happen. The mobile computing may also retrieve one or more news-feed stories from the server by transmitting a request to the server, causing the server to transmit the news-feed stories to the mobile computing device. The mobile computing device may display most recently received real-time activity stories (or most recently retrieved news-feed stories) at the top of the scrollable visual stack. For example, the mobile computing device may display most recently received real-time activity stories 520g and 520h at the top of the scrollable visual stack 500, as illustrated in FIG. 5C. Additionally, in particular embodiments, the mobile computing device may collapse a plurality of adjacently displayed real-time activity stories in a frame within the scrollable visual stack. That is, if there are more than the specified number (e.g., three) of real-time activity stories adjacently displayed in the scrollable visual stack, the mobile computing device may collapse them into a frame (a "ticker box") of real-time activity stories. For example, the mobile computing device may collapse real-time activity stories 520g, 520h, and 520i in a frame 535, as illustrated in FIG. 5D. Similarly to the frame 530, the frame 535 may display no more than a specified number (e.g., three) of real-time activity stories. The frame 535 may also display a selectable icon 540 that indicates additionally available real-time activity stories.

In particular embodiments, the mobile computing device may remove one or more real-time activity stories from the scrollable visual stack 500, if the one or more real-time activity stories are related a news-feed story displayed in the scrollable visual stack 500. For example, the mobile computing device may receive from the social-networking system a particular real-time activity story about a user posting a photo to the social-networking system, and display the particular real-time activity story in the scrollable visual stack 500. The mobile computing device may retrieve from the social-networking system, at a later time, a news-feed story aggregating activities related to the photo (e.g., a count of "likes" of the photo by other users, comments related to the photo, as described earlier). The news-feed story may also comprise an identifier of the particular real-time activity story (that is related to the news-feed story). The mobile computing device may display the news-feed story at the top of scrollable visual stack 500, while removing the particular real-time activity story (based on its identifier) from the scrollable visual stack 500. The mobile computing device may also remove from the scrollable visual stack 500 other real-time activity stories that are related to the real-time activity story (e.g., a real-time activity story about another user's comment on the photo).

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 6:
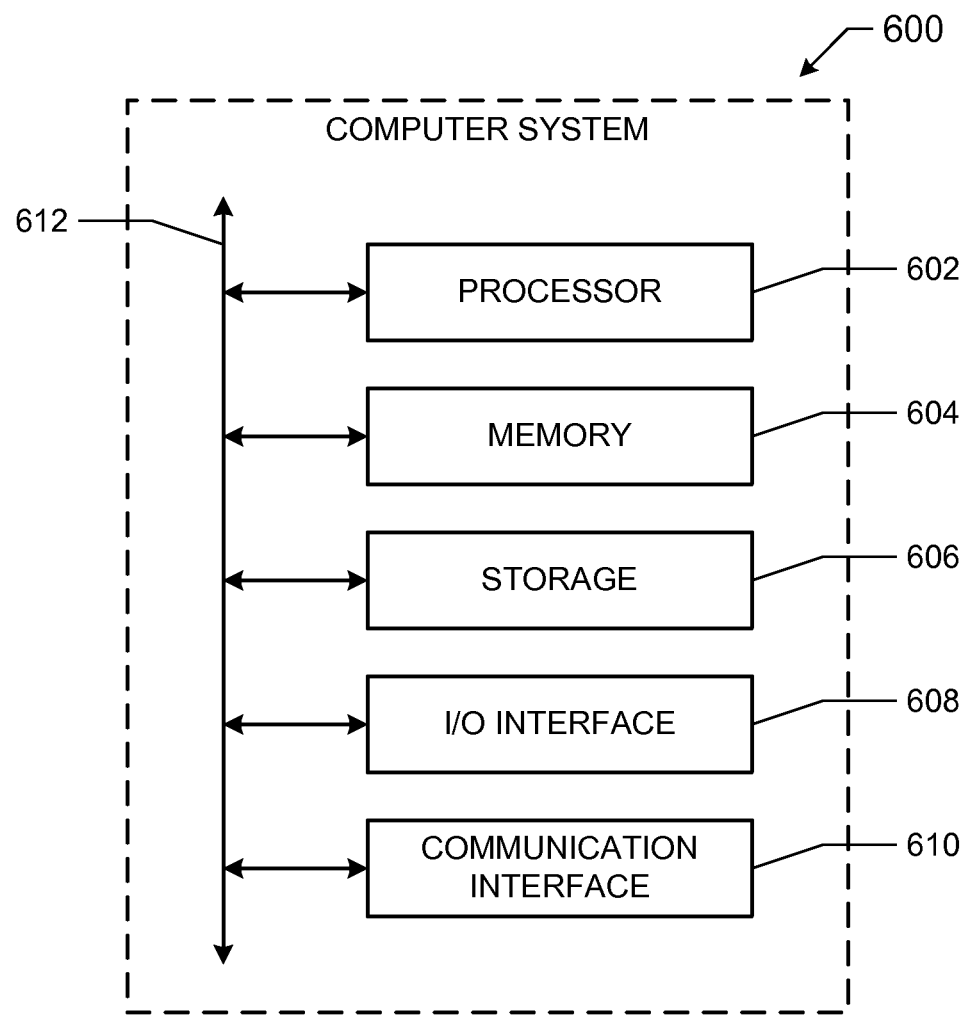
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by a mobile computing device, receiving from a server one or more real-time activity stories to the mobile computing device for display by the mobile computing device, the real-time activity stories being sent automatically by the server to the mobile computing device while a user is interacting with the mobile computing device, wherein each real-time activity story describes an interaction between a different user and a social-networking system, and is sent in response to the interaction;

by the mobile computing device, receiving from the server one or more news-feed stories for display by the mobile computing device, the news-feed stories being sent by the server to the mobile computing device in response to requests from the mobile computing device for the news-feed stories; and by the mobile computing device, displaying to the user:
a moving stream of the real-time activity stories in a scrollable ticker box, the moving stream displaying the real-time activity stories in chronological order; and
a scrollable visual stack of the news-feed stories;
by the mobile computing device, receiving from the server an aggregated story that aggregates activities related to an object stored on the social-networking system;
by the mobile computing device, determining that at least one of the real-time activity stories being displayed is related to the object and
by the mobile computing device, displaying the aggregated story while removing the at least one of the real-time activity stories from the moving stream.

2. The method of claim 1, further comprising:
by the mobile computing device, receiving from the server one or more additional stories at the mobile computing device;
by the mobile computing device, adding the additional stories to the moving stream of the real-time activity stories;
by the mobile computing device, collapsing at least one of the real-time activity stories into a frame of the scrollable ticker box; and
by the mobile computing device, displaying to the user at least one of the additional stories in the scrollable ticker box as the moving stream progresses.

3. The method of claim 1, further comprising:
by the mobile computing device, receiving from the server one or more additional stories at the mobile computing device, wherein at least one of the additional stories is associated with at least one of the real-time activity stories;
by the mobile computing device, aggregating information from the at least one additional story that is associated with the at least one real-time activity story to create an aggregated story;
by the mobile computing device, displaying to the user the aggregated story in the scrollable ticker box.

4. The method of claim 3, further comprising:
by the mobile computing device, removing the associated at least one real-time activity story from the scrollable ticker box.

5. The method of claim 1, further comprising:
by the mobile computing device, determining that the user is interacting with the mobile computing device; and
by the mobile computing device, in response to determining that the user is interacting with the mobile computing device, transmitting a message to the server to continue transmission of real-time activity stories to the mobile computing device.

6. The method of claim 1, further comprising:
by the mobile computing device, determining that the user is not interacting with the mobile computing device; and
by the mobile computing device, in response to determining that the user is not interacting with the mobile computing device, transmitting a message to the server to terminate transmission of real-time activity stories to the mobile computing device.

7. The method of claim 6, wherein determining that the user is not interacting with the mobile computing device comprises determining that the user has not interacted with a user interface of the mobile computing device for over a specified time.

8. One or more computer-readable non-transitory storage media embodying software that is operable when executed to:
receive from a server one or more real-time activity stories to a mobile computing device for display by the mobile computing device, the real-time activity stories being sent automatically by the server to the mobile computing device while a user is interacting with the mobile computing device, wherein each real-time activity story describes an interaction between a different user and a social-networking system, and is sent in response to the interaction;
receive from the server one or more news-feed stories for display by the mobile computing device, the news-feed stories being sent by the server to the mobile computing device in response to requests from the mobile computing device for the news-feed stories; and
display to the user:
a moving stream of the real-time activity stories in a scrollable ticker box, the moving stream displaying the real-time activity stories in chronological order; and
a scrollable visual stack of the news-feed stories;
receive from the server an aggregated story that aggregates activities related to an object stored on the social-networking system;
determine that at least one of the real-time activity stories being displayed is related to the object; and
display the aggregated story while removing the at least one of the real-time activity stories from the moving stream.

9. The media of claim 8, further comprising:
by the mobile computing device, receiving from the server one or more additional stories at the mobile computing device;
by the mobile computing device, adding the additional stories to the moving stream of the real-time activity stories;
by the mobile computing device, collapsing at least one of the real-time activity stories into a frame of the scrollable ticker box; and
by the mobile computing device, displaying to the user at least one of the additional stories in the scrollable ticker box as the moving stream progresses.

10. The media of claim 8, further comprising:
by the mobile computing device, receiving from the server one or more additional stories at the mobile computing device, wherein at least one of the additional stories is associated with at least one of the real-time activity stories;
by the mobile computing device, aggregating information from the at least one additional story that is associated with the at least one real-time activity story to create an aggregated story;
by the mobile computing device, displaying to the user the aggregated story in the scrollable ticker box.

11. The media of claim 10, further comprising:
by the mobile computing device, removing the associated at least one real-time activity story from the scrollable ticker box.

12. The media of claim 8, further comprising:
by the mobile computing device, determining that the user is interacting with the mobile computing device; and
by the mobile computing device, in response to determining that the user is interacting with the mobile computing device, transmitting a message to the server to continue transmission of real-time activity stories to the mobile computing device.

13. The media of claim 8, further comprising:
by the mobile computing device, determining that the user is not interacting with the mobile computing device; and
by the mobile computing device, in response to determining that the user is not interacting with the mobile computing device, transmitting a message to the server to terminate transmission of real-time activity stories to the mobile computing device.

14. The media of claim 13, wherein determining that the user is not interacting with the mobile computing device comprises determining that the user has not interacted with a user interface of the mobile computing device for over a specified time.

15. A computing device comprising:
one or more processors; and
one or more computer-readable non-transitory storage media coupled to the processors and embodying software that is operable when executed by the processors to:
receive from a server one or more real-time activity stories to the mobile computing device for display by the computing device, the real-time activity stories being sent automatically by the server to the computing device while the user is interacting with the computing device, wherein each real-time activity story describes an interaction between a different user and a social-networking system, and is sent in response to the interaction;
receive from the server one or more news-feed stories for display by the computing device, the news-feed stories being sent by the server to the computing device in response to requests from the computing device for the news-feed stories; and
display to the user:
a moving stream of the real-time activity stories in a scrollable ticker box, the moving stream displaying the real-time activity stories in chronological order; and
a scrollable visual stack of the news-feed stories;
receive from the server an aggregated story that aggregates activities related to an object stored on the social-networking system;
determine that at least one of the real-time activity stories being displayed is related to the object; and
display the aggregated story while removing the at least one of the real-time activity stories from the moving stream.

16. The computing device of claim 15, further comprising:
by the mobile computing device, receiving from the server one or more additional stories at the mobile computing device;
by the mobile computing device, adding the additional stories to the moving stream of the real-time activity stories;
by the mobile computing device, collapsing at least one of the real-time activity stories into a frame of the scrollable ticker box; and
by the mobile computing device, displaying to the user at least one of the additional stories in the scrollable ticker box as the moving stream progresses.

17. The computing device of claim 15, further comprising:
by the mobile computing device, receiving from the server one or more additional stories at the mobile computing device, wherein at least one of the additional stories is associated with at least one of the real-time activity stories;
by the mobile computing device, aggregating information from the at least one additional story that is associated with the at least one real-time activity story to create an aggregated story;
by the mobile computing device, displaying to the user the aggregated story in the scrollable ticker box.

18. The computing device of claim 17, further comprising:
by the mobile computing device, removing the associated at least one real-time activity story from the scrollable ticker box.

19. The computing device of claim 15, further comprising:
by the mobile computing device, determining that the user is interacting with the mobile computing device; and
by the mobile computing device, in response to determining that the user is interacting with the mobile computing device, transmitting a message to the server to continue transmission of real-time activity stories to the mobile computing device.

20. The computing device of claim 15, further comprising:
by the mobile computing device, determining that the user is not interacting with the mobile computing device; and
by the mobile computing device, in response to determining that the user is not interacting with the mobile computing device, transmitting a message to the server to terminate transmission of real-time activity stories to the mobile computing device.

* * * * *